Sept. 13, 1932.   H. J. BRUBAKER ET AL   1,876,847
FEEDING MECHANISM
Filed Nov. 13, 1929   2 Sheets-Sheet 2
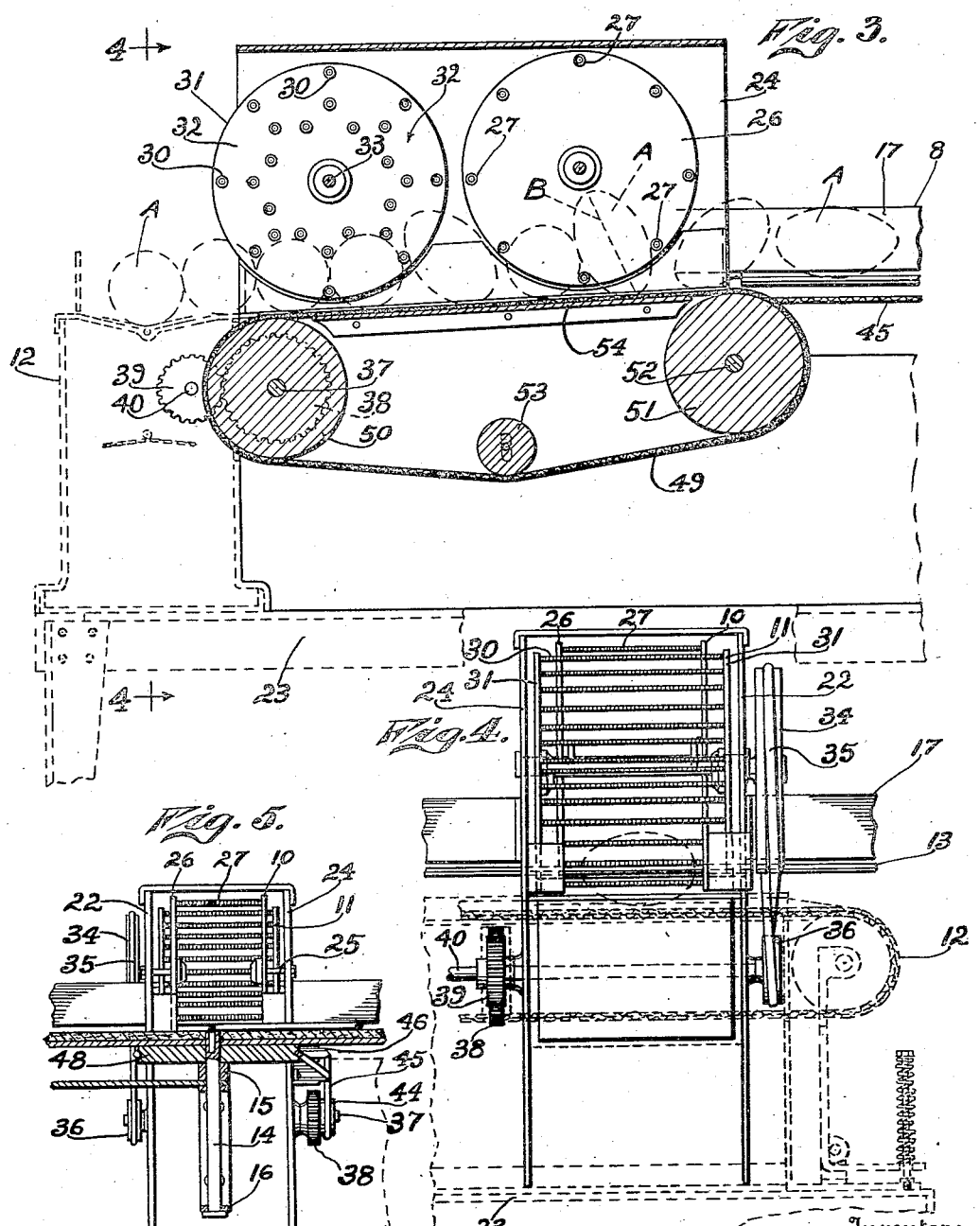
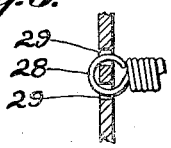
Inventors
Henry J. Brubaker
John B. Brubaker
By Lyon & Lyon
Attorneys Patented Sept. 13, 1932

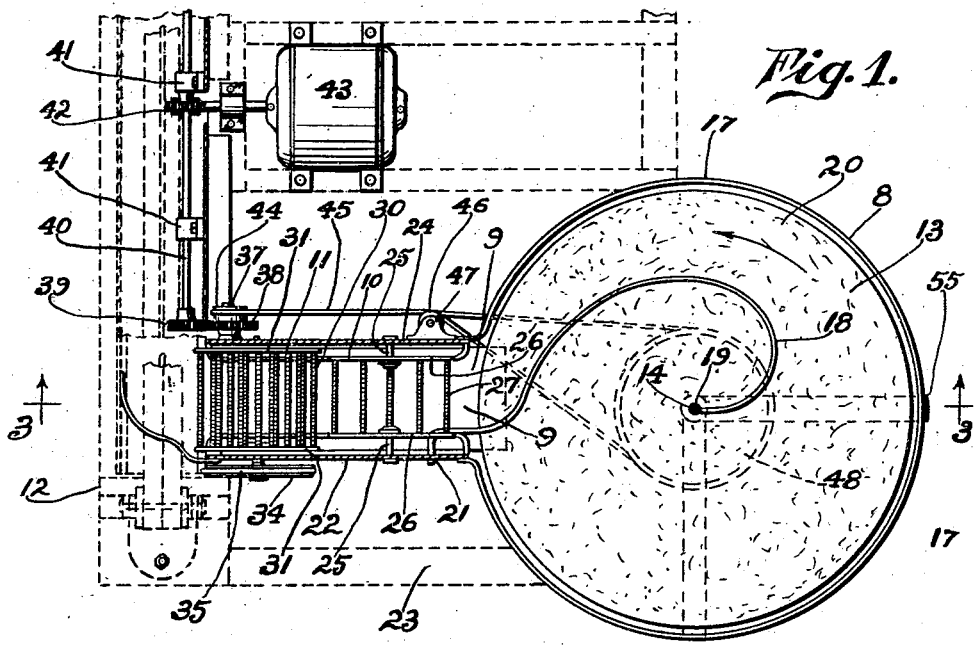
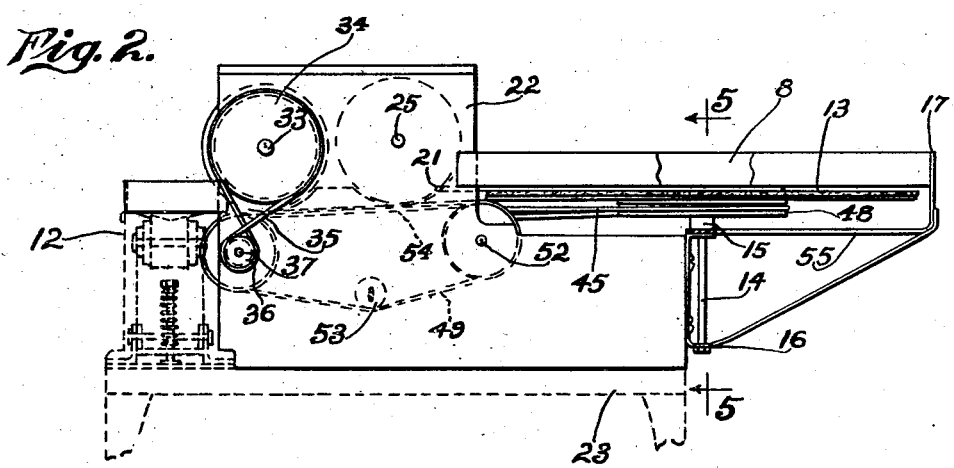

1,876,847

UNITED STATES PATENT OFFICE

HENRY J. BRUBAKER AND JOHN B. BRUBAKER, OF SAN DIMAS, CALIFORNIA, ASSIGNORS, BY MESNE ASSIGNMENTS, TO KUNKEL MANUFACTURING COMPANY, LTD., OF LOS ANGELES, CALIFORNIA, A CORPORATION OF CALIFORNIA

FEEDING MECHANISM

Application filed November 13, 1929. Serial No. 406,812.

This invention relates to feeding mechanisms and it is of a type useful, for example, for feeding bodies, such as eggs, into an apparatus such, for example, as a grader. The invention may be used, for example, for feeding eggs to the weight grading machine disclosed in our copending application filed April 15, 1929, Serial Number 355,086, said machine operating to grade the eggs by weight. In the operation of said weight grading machine, it is essential that the eggs be deposited on a belt of said machine with the longitudinal axes of the eggs extending lengthwise of the belt, in order to secure accuracy in the grading of the eggs by weight, since the weight of the egg, as said egg passes over a lever, depresses said lever and permits the egg to roll off of the belt that is supported at this point by the lever.

The center of gravity of the egg should be exactly over the pivotal axis of the lever, since said lever is mounted so that its pivot is caused to move downwardly by a sufficient weight, since said pivot connects the lever on which the belt rests with a second lever. Accordingly, if the center of gravity of the egg on the belt were not immediately over the pivot but, instead, were displaced in the direction that the lever tilts, said lever would be caused to tilt by an egg of less weight than would be required to tilt said lever if the center of gravity of the egg were immediately over the pivotal axis of said lever. Accordingly, a very important object of this invention is to make provision for feeding all of the eggs to the apparatus, with which the feeding mechanism functions, with the longitudinal axes of said eggs immediately over the center line of the belt of the conveyor of the greater or other apparatus to which the eggs are fed.

Another important object is to make provision for the eggs or other bodies or objects closely following one another as they discharge from the feeding mechanism, even though there may be considerable intervals between some of the eggs as they move from the hopper into the adjacent object turning unit.

Another object is the general improvement of mechanisms of this character.

A very important object is the feeding of eggs and like fragile objects without causing breakage thereof.

Another object is to provide a construction which will force the eggs from a hopper into an idler turning unit.

Another object is to provide a construction which operates to force the eggs from an idler turning unit into a positively driven turning unit.

Another important object is to provide a construction of turning unit which will yieldingly receive an egg or other fragile object and one in which the yielding elements will be put under more or less tension by the egg or other object engaging them so that said elements will aid in ejecting the egg from the turing unit.

Other objects and advantages will appear in the subjoined detailed description.

The accompanying drawings illustrate the invention.

Figure 1 is a plan view of a feeding mechanism constructed in accordance with the provisions of this invention, an apparatus with which the feeding mechanism functions being fragmentarily indicated in dotted lines.

Figure 2 is a front elevation, partly in section, of Figure 1.

Figure 3 is an enlarged vertical section on the line indicated by 3—3, Figure 1.

Figure 4 is an elevation seen from the line indicated by 4—4 in Figure 3.

Figure 5 is an elevation, partly in section, from the line indicated by 5—5, Figure 2.

Figure 6 is a sectional detail showing how the yielding turning unit members are secured at their opposite ends.

There is provided a hopper, indicated in general by the character 8, and having an opening 9 through which discharge takes place from said hopper into an object-turning unit 10. The object-turning unit 10 is cooperatively related to a second turning unit 11, adapted to receive the objects from the turning unit 10 and discharge said objects into the apparatus with which the feeding mechanism functions as, for example, the apparatus indicated in general by the character 12. In this instance, the apparatus 12 is a grading machine of the character disclosed in the hereinbefore mentioned application for patent and it forms no part of the present invention, being merely illustrated to aid in an understanding of the operation of the feeding mechanism.

The hopper 8 is constructed as follows: there is provided a driven element 13 which supports the objects that are to be fed to the turning unit 10. In this instance, the element 13 is a rotary element constituting the floor of the hopper and is mounted on a vertical shaft 14 that turns in bearings 15, 16. Surrounding the element 13 is a wall 17 provided at one side with the opening 9. Within the hopper 8 is a guiding means which serves to guide the objects from the more central portion of the element 13 to the peripheral portion thereof and this guiding means, in this instance, comprises a wire or rod 18 provided at its inner end with an eye 19 which fits over the upper end of the shaft 14 so as to anchor the inner end of said wire 18.

The wire 18 curves gradually outwardly toward the periphery of the element 13 so as to form a gradually reduced space or path 20 that leads toward the opening 9. The outer end of the wire 18 engages in the hole 21 formed in a wall 22 that constitutes one extension of the wall 17. The guide wire 18 is positioned close to but slightly above the upper surface of the element 13 so that there is no friction between said wire and the element 13, as the element 13 rotates.

The bearings 15, 16 are mounted on a suitable frame which is indicated, in general, by the character 23.

The turning unit 10 is rotatably mounted in the wall 22 and in another wall 24 that parallels the wall 22 and that forms another extension of the wall 17. Said turning unit is constructed as follows: rotatably mounted at its opposite ends in the walls 22, 24 is the shaft 25 of the turning unit 10. The turning unit 10 comprises side members 26 which rotate with the shaft 25. Connected at their opposite ends to the side members 26 are flexible, resilient or yielding cross members 27 which, in this instance, are in the form of coil springs provided at their opposite ends with eyes 28, each of which passes through a pair of opening 29 in one of the side members 26, as clearly shown in Figure 6. The openings 29 are positioned adjacent to the peripheries of the side members 26 and the spacing of adjacent members 27 is approximately equal to the short diameter of the larger of objects A, such as eggs, that are to pass through the feeding mechanism, in order that, as the objects A leave the hopper, they enter between adjacent members 27, as clearly shown in Figure 3. The spacing of the side members 26 is slightly greater than the longitudinal dimension of the longest objects that are to be fed by the mechanism.

It will be understood that the objects A are of various sizes as is commonly encountered, for example, in the grading of eggs, some of which are considerably larger than others.

It is to be particularly noted that, preferably the turning unit 10 is a freely revolvable or idling unit, the only driving power for said unit being the thrust of the objects A when said objects are moved by the belt 49 into contact with a pair of the cross members 27 as said objects are received by said belt through the opening 9 from the element 13 which rotates in the direction of the arrow thereon in Figure 1.

Though it may be sufficient to employ but one turning unit between the hopper and the apparatus 12 to which the objects are fed, it is preferable to also employ the other turning unit 11. The turning unit 11 is constructed somewhat similar to the turning unit 10 but differs somewhat therefrom by reason of the disposition of the flexible, resilient or yielding cross members 30 which are connected at their opposite ends to side members 31 of the unit 11.

The flexible members 30, in this instance, are arranged in three series: an outer series of which the members 30 are spaced the same as the members 27, an inner series of which the elements 30 occupy positions on radial lines that pass substantially midway between adjacent members 30 of the outer series, and an intermediate series, the members 30 of which approximately occupy positions on radial lines passing through the members 30 of the outer series. This construction produces a plurality of yielding pockets which are indicated by the character 32.

The side members 31 turn with a shaft 33 that has its opposite ends rotatably mounted in the walls 22, 24. The turning unit 11 is driven, and this is effected by any suitable driving mechanism including, in this instance, a pulley 34 mounted on the shaft 33, a crossed belt 35 connecting the pulley 34 with a second pulley 36 mounted on a shaft 37. The shaft 37 is driven by a spur gear 38 in mesh with a spur pinion 39 on a shaft 40 which turns in bearings 41. The shaft 40 is driven through worm gearing 42 from a motor 43.

In the present instance, the driving connections for the hopper element 13 are as follows: the shaft 37 is provided with a pulley 44 operating a belt 45 which passes over an idler pulley 46 that is rotatably mounted at 47 on the wall 24. The belt 45 passes around a pulley 48 mounted on the shaft 14 just beneath the hopper element 13, the idler pulley 46 serving to change the operating plane of the belt 45 from a vertical plane between said idler pulley 46 and the pulley 44 to a horizontal plane between the idler pulley 46 and the pulley 48.

The objects A pass through the hopper opening 9 on to a moving surface formed, in this instance, by the upper run of an endless belt 49 which passes around a pulley 50 driven by the shaft 37 and another pulley 51 mounted on shaft 52 which has its opposite ends rotatably mounted in the side walls 22, 24, which walls are mounted on or form portions of the frame 23. The lower run of the belt 49 passes beneath an idler pulley 53 which serves to keep the belt 49 taut. The upper run of the belt 49 moves over and is supported by a stationary flat table 54 which extends beneath and somewhat below the level of the turning units 10, 11 so that the upper run of the belt 49 will be supported in proximity to but slightly spaced from the lowermost members 27, 30 of the turning units.

The driving connections hereinbefore described are such as to cause higher speed of the belt 49 than of the members 30 so as to tend to crowd the objects A forwardly into the driven turning element 11. Thus, if the objects A should be irregularly discharged from the hopper at any time, resulting in a space being left between one object and the next succeeding object, within the turning element 10, said succeeding object will be quickly carried by the belt 49 forwardly into a pocket of the turning element 11 immediately to the rear of the pocket into which the object ahead has been received. This insures that the objects will be fed to the apparatus 12 in close succession, thus maximizing the output of the apparatus 12.

The side walls 17 of the hopper, in this instance, project upwardly from a stationary bottom 55 which extends beneath the rotary element 13 and pulley 48, the shaft 14 projecting through said bottom 55. Of course, the bottom 55 is not essential and may readily be omitted without affecting the function of the machine.

The foregoing will make clear the construction and operation of the invention and, briefly stated, said invention operates as follows: assuming, for example, that the objects A are poultry eggs of varying sizes and that the motor 43 is operating, the eggs will be placed by an operator upon the hopper element 13 which is rotating at a relatively low speed. The operator may feed the eggs to the hopper fast enough to practically fill said hopper and the eggs near the center of the element 13 will be moved into engagement with the wire 18 and by said wire caused to be crowded toward the hopper wall 17. By the time that the eggs reach a position close to the hopper opening 9, said eggs will be positioned in single file and in that way will pass through the hopper opening 9. The eggs discharge onto the relatively fast operating belt 49 and are carried thereby into the turning element 10. If an egg should be received by the turning element 10 with its longitudinal axis B pointing toward the center of said turning element, as indicated in Figure 3, as said egg progresses it will be relieved from pressure of the next succeeding egg and, being in an unbalanced position, it will turn until its longitudinal axis is substantially parallel to the members 27. In other words, the eggs will be kept rotating about their longitudinal axes by reason of the belt 49 moving them while said eggs are in contact with the members 27 and thus the eggs will tend to discharge from the turning element 10 with their short axes pointed in the direction of travel of the eggs. However, should an egg thus standing on end, as above described, be carried this way through the turning element 10 so as to still be standing on end, or approximately so, when it is received by the turning element 11, the yielding pressure produced on the upper end of the egg by those members 30 that constitute the inner and intermediate series will cause the egg to turn lengthwise of the members 30 and thus position it properly for discharge from the turning element 11 onto the apparatus 12. The freely rotatable turning element 10 receives the eggs and prevents crowding of the eggs into the turning element 11 which is positively driven.

It is very important that eggs be fed to the belt of a grading machine, of the type disclosed in the hereinbefore mentioned patent application, with their longitudinal axes perfectly aligned with the center line of the belt and, accordingly, the herein described feeding mechanism operates with a high degree of efficiency to obtain this result. In the grading apparatus mentioned it is essential that the center of gravity of the egg be immediately over the center line of the belt of said apparatus in order that the egg will not be discharged prematurely from said belt, as might occur if the center of gravity of the egg were not immediately over the center line of said belt.

The advantage of having the guiding member 18 in the form of a rod or wire is that the pressure of the objects upon one another and of the objects against the wall 17 and member 18 will thereby be prevented from attaining an amount sufficient to produce crushing of one or more of the objects being crowded together within the gradually narrowing space or path 20, for, before the pressure attains serious proportions, the object or objects next to the member 18 will be forced or crowded over said member 18 toward the more nearly central portion of the element 13, thereby releasing the pressure.

We have found that a wire of relatively small diameter such as .092 of an inch gives better results than a wire of relatively large diameter because the object will pass under less pressure over the smaller size wire.

We claim:

1. A feeding mechanism comprising a movably mounted object-supporting member, object-turning units rotatably mounted adjacent to one another above said member and extending transversely of the path of movement of said member and one of said units constructed and adapted to successively frictionally engage the rear side of objects on said member and move said objects into engagement with another of said units, and a means to operate said member.

2. A feeding mechanism comprising a movably mounted object-supporting member, object-turning units rotatably mounted adjacent to one another above said member and extending transversely of the path of movement of said member and one of said units constructed and adapted to successively frictionally engage the rear side of objects on said member and move said objects into engagement with another of said units, the first one of said turning units being freely rotatable, and a means to operate said member.

3. A feeding mechanism comprising a movably mounted object-supporting member, object-turning units rotatably mounted adjacent to one another above said member and extending transversely of the path of movement of said member and one of said units constructed and adapted to successively frictionally engage the rear side of objects on said member and move said objects into engagement with another of said units, and a means to operate said member, the first one of said turning units being freely rotatable and the other turning unit being driven at a lower speed than the object-supporting member.

4. A feeding mechanism comprising a movably mounted object-supporting member, object-turning units rotatably mounted adjacent to one another above said member and extending transversely of the part of movement of said member and one of said units constructed and adapted to successively frictionally engage the rear side of objects on said member and move said objects into engagement with another of said units, a means to operate said member, and a movably mounted member to feed the objects into engagement with the turning unit.

5. A feeding mechanism comprising a movably mounted object-supporting member, object-turning units rotatably mounted adjacent to one another above said member and extending transversely of the path of movement of said member and one of said units constructed and adapted to successively frictionally engage the rear side of objects on said member and move said objects into engagement with another of said units, the first one of said turning units being freely rotatable, a means to operate said member, and a movably mounted member to feed the objects into engagement with the freely rotatable turning unit.

6. A feeding mechanism comprising a movably mounted object-supporting member, object-turning units rotatably mounted adjacent to one another above said member and extending transversely of the path of movement of said member and one of said units constructed and adapted to successively frictionally engage the rear side of objects on said member and move said objects into engagement with another of said units, a means to operate said member, the first one of said turning units being freely rotatable and the other turning unit being driven at a lower speed than the object-supporting member, and a movably mounted member to feed the objects into engagement with the freely rotatable turning unit.

7. The object-turning unit described comprising rotatably mounted side members, cross members connected at their opposite ends to said side members and spaced to admit of the entrance of an egg shaped object therebetween with the short diameter of said object extending at a right angle to said cross members, and an object carrying member mounted to move beneath the cross members.

8. The object-turning unit described comprising rotatably mounted side members, and elastic cross members connected at their opposite ends to said side members and spaced to admit of the entrance of an egg or similar shaped object therebetween with the short diameter of said object extending at a right angle to said elastic cross members.

9. The object-turning unit described comprising rotatably mounted side members, and flexible cross members connected at their opposite ends to said side members and spaced to admit of the entrance of an egg or similar shaped object therebetween with the short diameter of said object extending at a right angle to said flexible cross members.

10. The hopper described comprising a rotatably mounted disc-like element, a stationary wall surrounding said element and provided with an opening, a guide member above said element extending in a curve approximately from a point over the center of said element to one side of said opening, the guide member being sufficiently low to permit objects placed on the disc-like element to pass over said guide member when pressure of objects in the rear comes upon the object next to said guide member, the space between said guide member and said wall gradually decreasing toward said opening, and a means to rotate the disc-like element.

11. A feeding mechanism comprising a movable object-supporting member, means to operate said member, an object-aligning unit rotatably mounted above said member, said unit comprising a pair of laterally spaced frame members and a plurality of resilient cross members extending between and supported by said frame members, said cross members being uniformly spaced from the axis of said unit.

12. A feeding mechanism comprising a movable object-supporting member, means to operate said member, an object-aligning unit rotatably mounted above said member, said unit comprising a pair of laterally spaced frame members and a plurality of resilient cross members extending between and supported by said frame members, said cross members being uniformly spaced from the axis of said unit, said object-aligning unit being freely rotatable.

13. A feeding mechanism comprising a movably mounted object-supporting member, means to operate said member, an object aligning unit rotatably mounted above said member, said unit comprising a pair of laterally spaced frame members and a plurality of cross members, each cross member being longitudinally elastic and suspended between said spaced frame member in tension.

14. A feeding mechanism comprising a movable object-supporting member, means to operate said member, an object-aligning unit rotatably mounted above said member said unit comprising a pair of laterally spaced frame members, a plurality of resilient cross members extending between and supported by said frame members, said cross members being uniformly spaced from the axis of said unit, and a movably mounted member to feed objects into engagement with the turning unit.

Signed at Los Angeles, Calif., this 17th day of September, 1929.

HENRY J. BRUBAKER.
JOHN B. BRUBAKER.